United States Patent [19]
Ross

[11] 3,889,253

[45] June 10, 1975

[54] RASTER-SCAN DISPLAY SYSTEM HAVING IMPROVED MEANS FOR READING OUT STORED GAME-SCORE INFORMATION

[75] Inventor: Walter Lee Ross, Simi, Calif.

[73] Assignee: RCA Corporation, New York, N.Y.

[22] Filed: June 22, 1973

[21] Appl. No.: 372,645

[52] U.S. Cl. .......... 340/323; 273/54 C; 340/324 AD

[51] Int. Cl. .............................................. G06f 3/14

[58] Field of Search ............ 340/323 B, 336, 324 A, 340/324 AD; 273/54

[56] References Cited

UNITED STATES PATENTS 3,589,725 6/1971 Townsend et al. .................. 340/336

*Primary Examiner*—Marshall M. Curtis

*Attorney, Agent, or Firm*—Edward J. Norton; George J. Seligsohn

[57] ABSTRACT

In a raster-scan display of bowling score information in conventional format, wherein the identity of each player is displayed and corresponding items of pinfall data and score data for each player are displayed in separate rows, improved readout means access digital data storage means only once in reading out corresponding items of both pinfall data and score data for each player, thereby cutting the readout rate to one-half of what would otherwise be required. This is accomplished by taking advantage of the fact that the size of the alphabet of different characters required to display the identity of the players is greater than the sum of the sizes of the respective alphabets of characters needed to provide pinfall data and characters needed to provide score data. A single data register of sufficient capacity to store the number of bits required for the characters of the player identity alphabet is operated as a single register for the raster-scan line display of player identity information and, alternatively, is divided into two smaller-sized registers for the display of corresponding items of pinfall data and score data.

6 Claims, 4 Drawing Figures

AUTOMATIC BOWLING SCORING SYSTEM

DISPLAY SYSTEM

RASTER-SCAN DISPLAY SYSTEM HAVING IMPROVED MEANS FOR READING OUT STORED GAME-SCORE INFORMATION

This invention relates to a raster-scan display system for displaying predetermined types of data in a standardized format and, more particularly, to such a system which is suitable for displaying certain types of game-score information in such a standardized format.

Some standardized game-score formats, such as a baseball box score or a bowling score, have certain special characteristics, not present in conventional alphanumeric display formats utilized by general purpose raster-scan data display terminals which make it possible to more efficiently design the raster-scan display system. Among these characteristics is the fact that the game-score display field is spatially divided into separate first and second regions, with the name or identity of the players being displayed exclusively in the first region and the respective score information for each player being displayed exclusively in the second region. Further, the size of the alphabet of separate characters required to identify the name of any player and, in some cases, the position or status of that player in the game, is much larger than the size of the alphabet of separate characters or symbols required to display game-score type information.

Automatic game-scoring systems have been developed in which the game score information is displayed on a video display device, such as the face of a cathode ray tube. One such system, directed to the game of bowling is disclosed in U.S. Pat. No. 3,589,725, issued to Ralph Townsend et al. on June 29, 1971. Although, in this patent, bowling game score information is in the conventional standardized format for bowling (the score for each of a plurality of bowlers being presented in a different row of the display with the bowlers name to the left and the pinfall and score information for each of the ten frames being presented to the right of the bowlers name), only the pinfall and game score information portion of the format is presented on the face of the video display device. The names of the players are provided on labels each of which is held by an appropriately located holder.

An improved automatic bowling score system has been developed in which the entire standardized bowling format, including both the bowlers names and the frame information, is displayed on the video display device.

Although this new automatic bowling score system is employed herein to illustrate the present invention, it should be understood that the present invention may be employed with the full benefit in the display of game-score information in any type of game in which the principles of the present invention apply.

Briefly, the present invention is directed to a raster-scan data display system incorporating storage means and readout means coupled to the storage means for use in electronically displaying stored game-score data of a given kind of game in a standardized format on a video-signal display device while the game is progressing. The format includes an individual strip region devoted to any given player with a first predetermined portion of the strip region having displayed therein a single row of characters identifying the given player and with a second predetermined portion of the strip having displayed therein a plurality of rows of characters defining score information of that given player. Further, the game-score data is such that a binary word having at least a predetermined number of bits is required to uniquely distinguish each character of a given alphabet of player-identifying characters, but the number of bits of a binary word required to uniquely distinguish each character of a preselected alphabet for any respective one of the plurality of rows of score information is sufficiently smaller than the predetermined number so that the sum of the bits of all the binary words required for all the respective ones of the plurality of rows of score information characters is no greater than the predetermined number.

In accordance with the present invention, the readout means includes (1) digital-to-video converter means responsive to digital addresses sequentially applied thereto for deriving a raster-scan video signal of characters manifested by the digital addresses; (2) time generating means; (3) first means for reading out from the storage means successive binary words each having the same given number of bits, in which the given number is at least as large as the predetermined number, and second means coupled to the first means and the time generating means. The second means is responsive to each read out binary word while the first portion of the strip region is being scanned for digitally addressing the digital-to-video converter with a single binary word having the predetermined number of bits. This provides the display of a single row of characters identifying the given player. Further, the second means is responsive to each read out binary word while the second portion of the strip region is being scanned for dividing the read out binary word into a plurality of separate binary words, each of which corresponds to a character of a different one of the plurality of rows of score information. The second means digitally addresses the digital-to-video converter with each one of these separate binary words to thereby provide for the display of all the plurality of score-information rows pertaining to each given player.

The features and advantages of the present invention will become more apparent from the following detailed description taken together with the accompanying drawing, in which.

Figure 1:
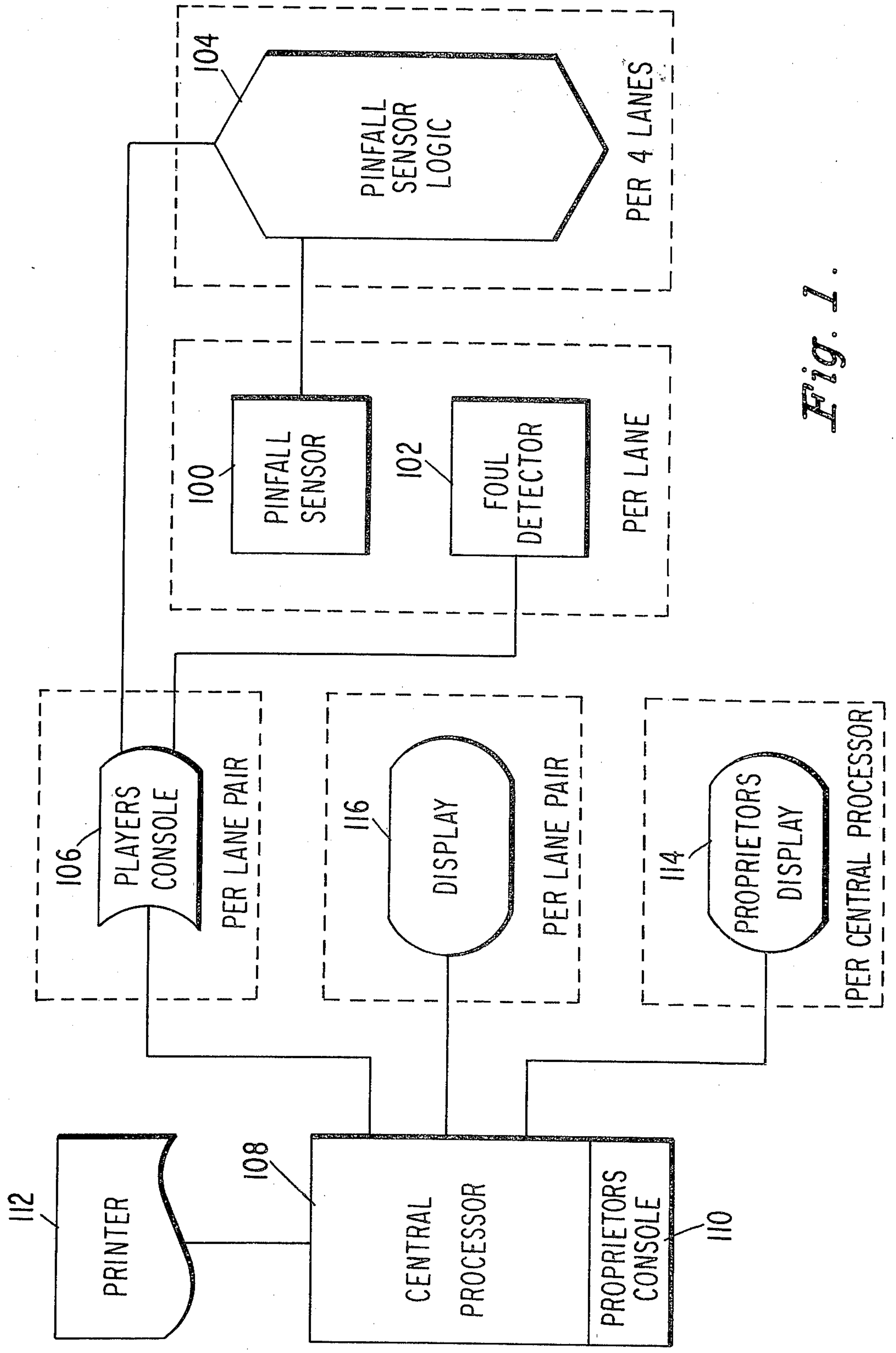
FIG. 1 is a functional block diagram of an automatic bowling score system which incorporates the present invention.

As shown in FIG. 1, each lane of a bowling alley is provided with its own pinfall sensor 100 and foul detector 102. Each group of four bowling lanes is provided with a single pinfall sensor logic means 104, which receives sensed pinfall information from the pinfall sensor 100 of each of the four lanes with which it is associated.

Each lane pair has a players-console 106 associated therewith. Players-console 106 includes manually operated means, such as a keyboard, thumbwheels and pushbuttons, for the players to enter appropriate data and other information into the system. In addition, the foul detector 102 of each of the lanes with which a players-console 106 is associated provides console 106 with foul information and pinfall center logic 104 provides each players-console 106 with coded pinfall data of each of the two lanes with which that console 106 is associated. All the data and information available at each players-console 106 is forwarded to a single central processor 108, which can handle as many as 32 lanes. Associated with central processor 108 is proprietor-console 110 through which the proprietor can exercise overall control of the lanes.

Central processor 108 includes time control means, a special-purpose computer, data storage means which may comprise a RAM, a digital-to-video converter which may comprise a ROM and, in accordance with the present invention, a crossed-line pattern generator associated with the time control means thereof.

Output means associated with central processor 108 include a single printer-console 112, a single proprietor-display 114 and a players-display 116 for each line pair. These displays are modified television monitors employing a raster-scan. The present invention is primarily concerned with the generation of the players-display.

In operation, the players employ the manually operated means at a players-console to enter each of their respective names. This data is forwarded to central processor 108 and stored at appropriate addresses of the RAM data storage means. As the game progresses, game score data is forwarded to central processor 108 and, after appropriate arithmetical processes, is stored for display in appropriate addresses of the RAM. This game score data includes pinfall information sensed by pinfall sensor 100, foul information detected by foul detector 102 and, in the case of error or otherwise, data which may be manually entered by the player with the manual data entry means of players-console 106.

The proprietor, with this console 110, may cause a permanent copy of any bowling score to be printed out on printer 112 or may display various types of data on proprietors-display 114. However, the embodiment of the present invention is mainly directed to the means for providing the type of bowling score display shown in FIG. 2 on the players-display 116 be employing the appropriate stored data in central processor 108. Because the present invention is not directed to the overall automatic bowling-scoring system, but only to the display portion thereof, the overall automatic bowling-scoring system will not be discussed in any further detail.

Figure 3:
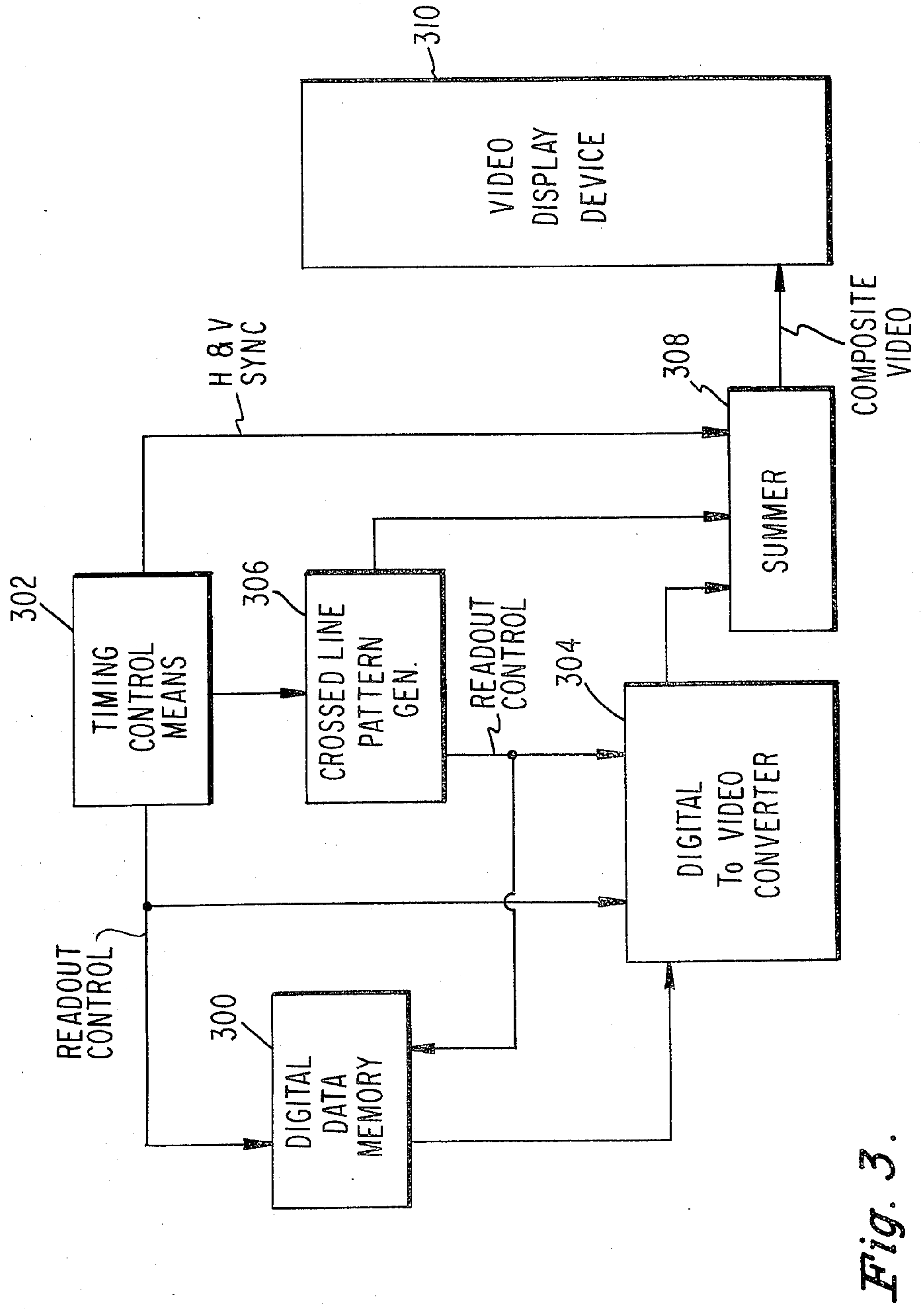
FIG. 3 is a block diagram of the raster-scan display system which incorporates the present invention.

Referring now to FIG. 3, there is shown in block diagram a display system incorporated in the overall bowling system of FIG. 1. Although this display system is in many ways similar to a conventional data display terminal employing a raster-scan display, it differs therefrom in several ways.

Figure 4:
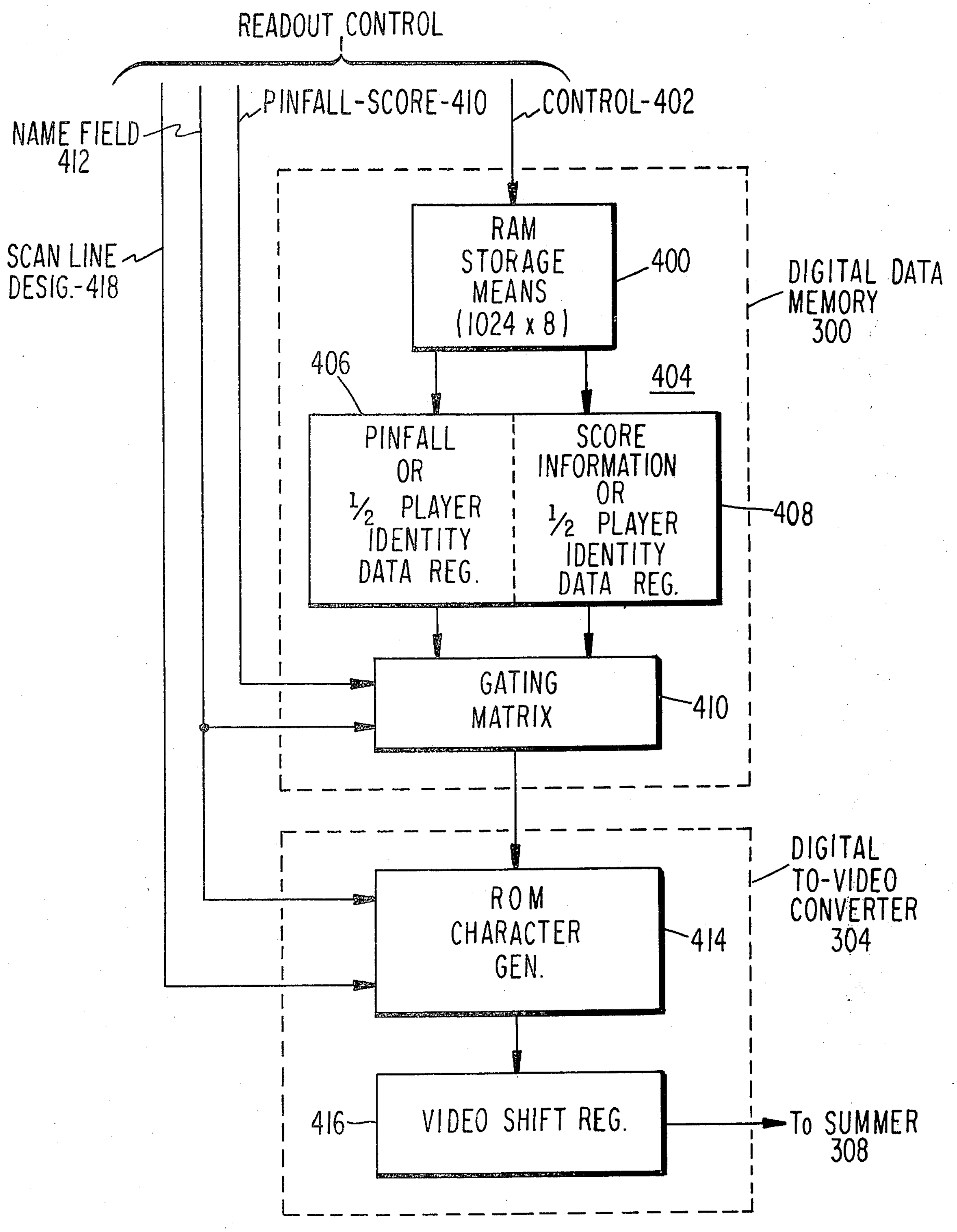
FIG. 4 is a block diagram of an embodiment of digital data memory 300 and digital-to-video converter 304 incorporating the present invention.

Specifically, digital data memory, which has the structure shown in detail in FIG. 4, has digital (binary) words stored at appropriate addresses thereof, each of which manifests the identity of the particular character, if any, to be displayed in each character space of the display format. Timing control means 302 generates a first portion of readout control signals which are applied both to the digital data memory 300 and digital-to-video converter 304, which has the structure shown in FIG. 4.

Figure 2:
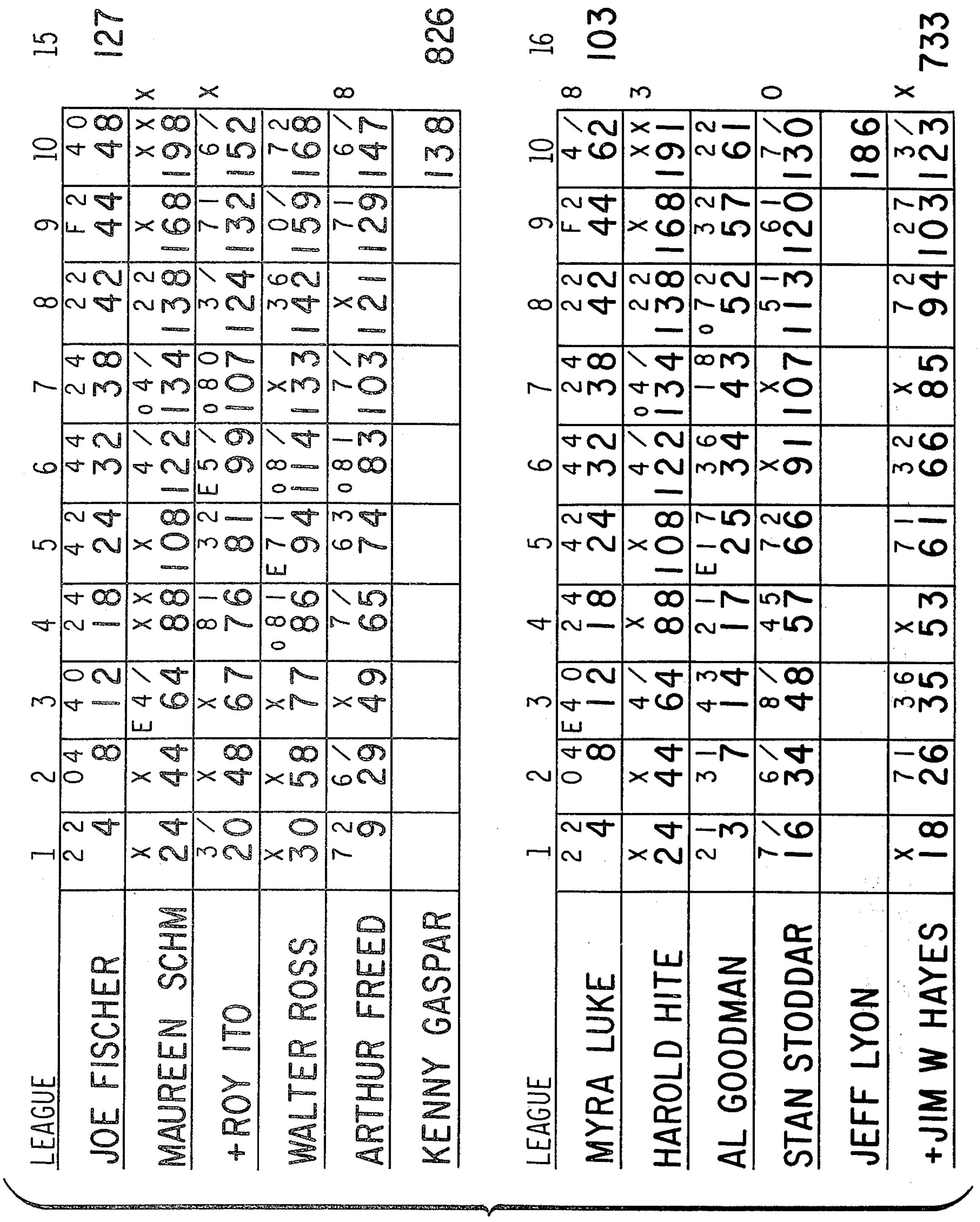
FIG. 2 shows the standardized fixed format of the bowling score display together with the displayed data of a typical bowling game.

Timing control means 302 also applies timing signals to crossed-line pattern generator 306, which generates the pattern of crossed lines delineating the fixed format shown in FIG. 2. For reasons which have nothing to do with the present invention, but which form part of the subject matter of my copending patent application Ser. No. 372,646 filed on even data herewith, digital data memory 300 and digital-to-video converter 304 has a first portion of readout control applied thereto directly from timing control means 302 and a second portion of readout control applied thereto indirectly through crossed-line pattern generator 306.

An embodiment of digital data memory 300 and digital-to-video converter 304, which incorporates the present invention, will be described in detail in connection with FIG. 4. However for the present, it is merely necessary to state that digital data memory and digital-to-video converter 304 cooperate to derive a raster-scan video signal of the character information for the bowling score format shown in FIG. 2. The output from digital-to-video converter is applied as a first input to summer 308. Summer 308 has a second input applied thereto from crossed-line pattern generator 306, which corresponds with the crossed vertical and horizontal line patterns which delineates the format shown in FIG. 2. In addition, summer 308 has horizontal and vertical sync signals from timing control means 302 applied as a third input thereto. The composite video signal appearing as an output from summer 308 is applied as an intensity-modulating signal input to video display device 310, which is normally a television monitor employing a cathode-ray tube display. As is conventional in a television monitor, video display device 310 includes a sync separator and horizontal and vertical scan generating circuitry responsive to the horizontal and vertical synch portion of the composite video signal applied thereto for providing horizontal and vertical scanning.

For reasons which will become apparent below, the deflection yoke of video display device 310 is rotated 90°, so that the raster-scan lines are in the vertical direction, rather than in the horizontal direction as is conventional. In all other respects, the display provided by video display device 310 preferably employs all the NTSC standards. In particular, the disclosed display of FIG. 2 provided by video display device 310 is assumed to be composed of a frame of 525 vertical raster-scan lines made up to two interlaced fields of 262.5 scan lines each.

It will be noted that the bowling score format shown in FIG. 2 is divided into a name field to the left and a score field to the right. All the characters in the name field are made up of twenty-six letters of the alphabet and the special symbol, +, indicative that the associated player is a "pacer" in accordance with the rules of the American Bowling Congress. Thus, the name field employs at least 27 characters, although there could be more. Further, as shown in FIG. 2, the name field is composed of a total of 14 character lines. In the preferred embodiment of the present invention, each character in each of these lines has a relative height of 14 units and a width of up to eight units.

It will be noted in FIG. 2 that the score field includes a row of characters aligned with the characters in each respective one of the fourteen rows of the name field. In particular, each of the score-field characters in line with the word "LEAGUE" identifies the respective frame numbers and the alley number. The score-field characters aligned with each player name displays a cumulative score, with team total and handicap information displayed at the extreme right.

As is conventional in the scoring of bowling, the score field also includes an upper row in the score field associated in which pinfall data for each player is displayed. Each of the characters of the pinfall data in each upper row has a relative height of only 10 units, although its relative width is still up to eight units. The lower row characters are similar to the name field characters, with which they are aligned, in having a relative height of 14 units and a relative width of up to eight units.

The size of the respective character alphabets making up the pinfall data and the score data, respectively, of the score field is significantly smaller than the size of the character alphabet utilized for the name field. In particular, the pinfall data alphabet is composed of the ten arabic numerals, the letter E denoting a manually-entered error correction, the letter F denoting a foul the symbol X denoting a stroke, the symbol / denoting a spare and the symbol 0 denoting a split. The character alphabet providing the score information in each lower row is composed solely of the ten arabic numerals.

The present invention, by employing a vertical raster-scan, takes advantage of the different sizes of the character alphabets employed respectively in the name field and the score field to significantly reduce the rate at which digital character data much be read out from digital data memory 300 to provide a display having the format shown in FIG. 2. In particular, it is necessary to derive all the character information to be displayed during any vertical raster-scan line within a time period of about 40 microseconds, the time that a vertical raster-scan line requires to trace overall height of the display. If the digital data memory 300 is accessed once for each row of the name field, an access rate of nearly three microseconds for each of the fourteen rows of the name field is required. However, if digital data memory 300 were to access each row of the score field, an access period of less than 1.5 microseconds would be required, because there are two rows of score-field information for each row of name-field information. However, in accordance with the present invention, as embodied in FIG. 4, digital data memory 300 need be accessed only 14 times during each vertical raster-scan line for both the name field and the score field of the display.

Referring now to FIG. 4, digital data memory 300 includes RAM storage means 400 which has a storage capacity for 1024 eight-bit words. Control 402, forming part of the readout control from timing control means 302 and crossed-line generator 306, may in practice include a plurality of conductors for sequentially addressing successive eight-bit binary-coded words identifying each successive character being read out.

Data register 404 is divided into a first four-bit data register 406 and a second four-bit data register 408. The first four bits of any read out eight-bit binary word from RAM storage means 400 are stored in portion 406 of the data register 404 and the second four-bits of the eight-bit binary word read out from RAM storage means 400 are stored in portion 408 of data register 404. The outputs from those portions 406 and 408 of data register 404 are applied as signal inputs to gating matrix 410 so that gating matrix 410 has pinfall-score and name field information on conductros 412 and 414, forming part of the readout control, applied as control inputs thereto. The output from digital data memory 300, which is applied as an input to digital-to-video converter 304 appears on a unique combination of the eight output conductors from gating matrix 410.

Digital-to-video converter 304, as is conventional in a raster-scan data display terminal, consists of a read only memory (ROM) character generator 414 and a video shift register 416. ROM 414 has the shape of each respective character of all the aforementioned character alphabets stored therein at its own respective address. As shown, the eight conductors emanating from gating matrix 410 of digital data memory 300 are applied as inputs to ROM character generator 414 of digital-to-video converter 304. In addition, ROM character generator 414 has the name-field information present on conductor 412 applied as a first control input thereto and has scan-line designation appearing on three conductors of the readout control applied as digital control inputs thereto.

Video shift register 416 acts as a parallel-to-serial converter for converting sixteen bits from character generator 414 applied to sixteen stages thereof to the video signal applied as an output from digital-to-video converter 304 to summer 308.

Name-field conductor 412 has a binary signal manifesting a first binary value, such as ONE, whenever the name field of the display shown in FIG. 2 is being scanned and has an opposite binary value, such as ZERO when the score field of the display is being scanned. The pinfall-score on conductor 410 is a binary signal which has a first binary value, such as ONE, during the respective portions of each vertical raster-scan line corresponding to the tracing of the lower row of the display of FIG. 2 as an opposite binary value, such as ZERO, during the respective portions of each vertical raster-scan line corresponding to the tracings of an upper row of the display of FIG. 2. Respective binary values present at any time on conductors 410 and 412 make it possible for gating matrix 410 to distinguish whether a displayed character is to be derived from (1) the name-field alphabet characters, (2) the lower-row score-manifesting alphabet of characters or (3) the upper-row pinfall-manifesting alphabet of characters. In response to the first condition, gating matrix 410 reads out both portions 406 and 408 of data register 404 simultaneously and forwards these outputs to corresponding ones of the eight conductors forming the output of the gating matrix 410. In response to the second condition, only portion 408 of data register 404 is read out and forwarded to a corresponding subset of four of the eight output conductors from gating matrix 410. In response to the third condition, only portion 406 of data register 408 is read out and forwarded to a corresponding subset of the other four of the eight output conductors from gating matrix 410.

The name-field manifesting binary signal on conductor 410 is also applied as an input to ROM character generator 414, thereby permitting generator 414 to distinguish between the occurrence of a name-field and the occurrence of a score-field. If a name-field is indicated, the entire set of signals present on the eight-conductor input to the character generator 414 from gating matrix 410 is used for appropriately addressing the portion of ROM character generator 414 in which the relatively-large name-field character alphabet is stored. If the binary value present on conductor 412 indicates that a score field is being scanned, the first subset of four of the eight conductor input through character generator 414 from gating matrix 410 is employed to address the relatively small score information character alphabet storage portion of character generator 414 and the second subset of the other four of the eight input conductors to character generator 414 from gating matrix 410 is employed to address the relatively small pinfall character alphabet storage portion of generator 414. Because of the alternative operation of gating matrix 410, described above, in forwarding either pinfall data or score information, but not both character generator 414 is never addressed simultaneously during the scan of a score field by both subsets of the set of eight conductors from gating matrix 410, so that character generator 414 separately reads out score information and pinfall data.

As is known in the art of raster-line data displays, each character being read out is divided into a given plural number of slices, each of which corresponds with a different ordinal one of a group of consecutive raster-scan lines. The three-bit code present on scan line designation conductors 418 manifests to character generator 414 which one of the ordinal bit units of character width is represented by the then current vertical scan line. With this information, character generator 414 selectively applies that 16-bit code to video shift register 416 which results in the appropriate video signal increment being generated and applied to summer 308. Of these 16 bits, the first and last bits correspond with spaces between characters and the intermediate 14 bits correspond to the maximum height of any character.

From the foregoing, it will be seen that only a single access to RAM storage means 400 is required to separately read out corresponding items of both score information and pinfall data. Thus, in the case of the bowling score format shown in FIG. 2, only 14 accesses of RAM storage means 400 are required during each vertical raster-scan line trace of the display, despite the fact that during the display of the score field, two separate items of data are sequentially read out for each of the players. This lowers the read out rate of RAM storage means 400 which contributes significantly to the practicality of the automatic bowling score system shown in FIG. 1.

What is claimed is:

1. In a raster-scan display system incorporating storage means, and readout means coupled to said storage means for use in electronically displaying stored game-score data of a given kind of game in a standardized format on a video-signal display device while the game is progressing, said format including an individual strip region thereof devoted to any given player with a first predetermined portion of said strip region having displayed therein a single line of characters identifying said given player and with a second predetermined portion of said strip region having displayed therein $k$ lines of characters defining score information of said given player, $k$ being a first plural integer, wherein a binary word having at least $n$ bits is required to uniquely distinguish each character of a given alphabet of player-identifying characters, $n$ being a second plural integer, and wherein the number of bits $m_i$ of a binary word required to uniquely distinguish each character of a preselected alphabet for the $i$th respective ordinal one of said $k$ lines of score-information is sufficiently smaller than $n$ so that $$n \geq \sum_{i=1}^{i=k} m_i ;$$

the improvement wherein:

said readout means includes digital-to-video converter means responsive to digital addresses sequentially applied thereto in synchronism with said raster-scan display for defining a raster-scan video signal of characters manifested by said digital addresses; time generating means for synchronizing said raster-scan display; first means for reading out from said storage means successive binary words each having the same given number of bits, said given number being at least as large as $n$; second means coupled to said first means and said time generating means and responsive to each readout binary word while said first portion of a strip region is being scanned for digitally addressing said digital-to-video converter with a single $n$-bit binary word to thereby provide the raster-scan display of said single line of characters identifying said given player, said second means being further responsive to each readout binary word while said second portion of a strip region is being scanned for dividing said readout binary word into $k$ separate $m_i$-bit binary words, each ordinal one of which corresponds to a character of a different ordinal one of said $k$ lines of score-information, and digitally addressing said digital-to-video converter in sequence with each ordinal one of said separate $m_i$-bit binary words to thereby provide the display of all of said $k$ score-information lines of said given player.

2. The system defined in claim 1, wherein said time generating means defines a raster scan for said display which is substantially normal to the length of a strip region.

3. The system defined in claim 1, wherein said given kind of game is bowling and said standardized format is that of a bowling score sheet in which said given player strip region extends horizontally with said first portion being located relatively to the left and said second portion being located relatively to the right, said second portion consisting of an upper row in which pinfall data for each of 10 bowling frames may be displayed and a lower row in which bowling score data for each said ten frames may be displayed; wherein said time generating means defines a raster scan for said display which is substantially vertical, defines a first binary signal having a given binary value when said raster scan is in the relatively left portion of its scan field in which said first portion is located and having an opposite binary value when said raster scan is in the relatively right portion of its scan field in which said second portion is located, and defines a second binary signal having a given binary value when a raster scan is traversing an upper row and an opposite binary value when a raster scan is traversing a lower row, and wherein said seconod means applies to said digital-to-video converter a digital address selected from the at least $n$-bits of said readout binary word in accordance with the respective binary values of said first and second signals.

4. The system defined in claim 3, wherein said digital-to-video converter includes a read-only memory.

5. The system defined in claim 3, wherein said given number of bits in each readout binary word is equal to the $n$ bits of the binary word defining the digital address of player-identifying character and said second means divides said given number of bits into first and second binary words each having half said given number of bits, whereby $k = 2$, $m_1 = n/2$ and $m_2 = n/2$, said first binary word corresponding to a character of said pinfall data and said second binary word corresponding to a character of said bowling-score data.

6. The system defined in claim 5, wherein said raster scan display consists of two interlaced fields.

* * * * *